(12) United States Patent
Huval et al.

(10) Patent No.: US 11,009,884 B2
(45) Date of Patent: May 18, 2021

(54) METHOD FOR CALCULATING NOMINAL VEHICLE PATHS FOR LANES WITHIN A GEOGRAPHIC REGION

(71) Applicant: Direct Current Capital LLC, Wilmington, DE (US)

(72) Inventors: Brody Huval, Mountain View, CA (US); James Patrick Marion, Mountain View, CA (US)

(*) Notice: Subject to any disclaimer, the term of this patent is extended or adjusted under 35 U.S.C. 154(b) by 268 days.

(21) Appl. No.: 16/149,006

(22) Filed: Oct. 1, 2018

(65) Prior Publication Data
US 2019/0243372 A1 Aug. 8, 2019

Related U.S. Application Data

(60) Provisional application No. 62/566,023, filed on Sep. 29, 2017.

(51) Int. Cl.
| | |
|---|---|
| G05D 1/02 | (2020.01) |
| B60W 50/04 | (2006.01) |
| B60W 30/095 | (2012.01) |
| G08G 1/16 | (2006.01) |
| G06K 9/00 | (2006.01) |
| B60W 50/00 | (2006.01) |

(52) U.S. Cl.
CPC ....... *G05D 1/0221* (2013.01); *B60W 30/0953* (2013.01); *B60W 50/045* (2013.01); *G05D 1/0214* (2013.01); *G05D 1/0274* (2013.01); *G06K 9/00798* (2013.01); *G08G 1/167* (2013.01); *B60W 2050/0031* (2013.01); *G05D 2201/0213* (2013.01)

(58) Field of Classification Search
CPC .. G05D 1/0221; G05D 1/0214; G05D 1/0274; G05D 2201/0213; B60W 30/0953; B60W 50/045; B60W 2050/0031; G06K 9/00798; G08G 1/167
See application file for complete search history.

(56) References Cited

U.S. PATENT DOCUMENTS

| | | | | |
|---|---|---|---|---|
| 2004/0066376 | A1* | 4/2004 | Donath | G01C 21/365 345/169 |
| 2009/0287376 | A1* | 11/2009 | Aso | B60W 10/20 701/42 |
| 2017/0008521 | A1* | 1/2017 | Braunstein | G01C 21/3407 |

(Continued)

*Primary Examiner* — Behrang Badii
(74) *Attorney, Agent, or Firm* — Polsinelli PC (57) ABSTRACT

One variation of a method for calculating nominal paths for lanes within a geographic region includes: serving a digital frame of a road segment to an annotation portal; at the annotation portal, receiving insertion of a lane marker label, for a lane marker represented in the digital frame, over the digital frame; calculating a nominal path over the road segment and defining a virtual simulator environment for the road segment based on the lane marker label; during a simulation, traversing the virtual road vehicle along the nominal path within the virtual simulator environment and scanning the virtual simulator environment for collisions between the virtual road vehicle and virtual objects within the virtual simulator environment; and, in response to absence of a collision between the virtual road vehicle and virtual objects in the virtual simulator environment, updating a navigation map for the road segment with the nominal path.

20 Claims, 3 Drawing Sheets

(56) References Cited

U.S. PATENT DOCUMENTS

| | | | |
|---|---|---|---|
| 2018/0329418 A1* | 11/2018 | Baalke | G08G 1/166 |
| 2019/0176862 A1* | 6/2019 | Kumar | G06K 9/00651 |
| 2019/0384294 A1* | 12/2019 | Shashua | G05D 1/0088 |

* cited by examiner

METHOD FOR CALCULATING NOMINAL VEHICLE PATHS FOR LANES WITHIN A GEOGRAPHIC REGION

CROSS-REFERENCE TO RELATED APPLICATIONS

This Application claims the benefit of U.S. Provisional Application No. 62/566,023, filed on 29 Sep. 2017, which is incorporated in its entirety by this reference.

This Application is related to U.S. patent application Ser. No. 15/635,177, filed on 27 Jun. 2017, which is incorporated in its entirety by this reference.

TECHNICAL FIELD

This invention relates generally to the field of autonomous vehicles and more specifically to a new and useful method for calculating nominal vehicle paths for lanes within a geographic region in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
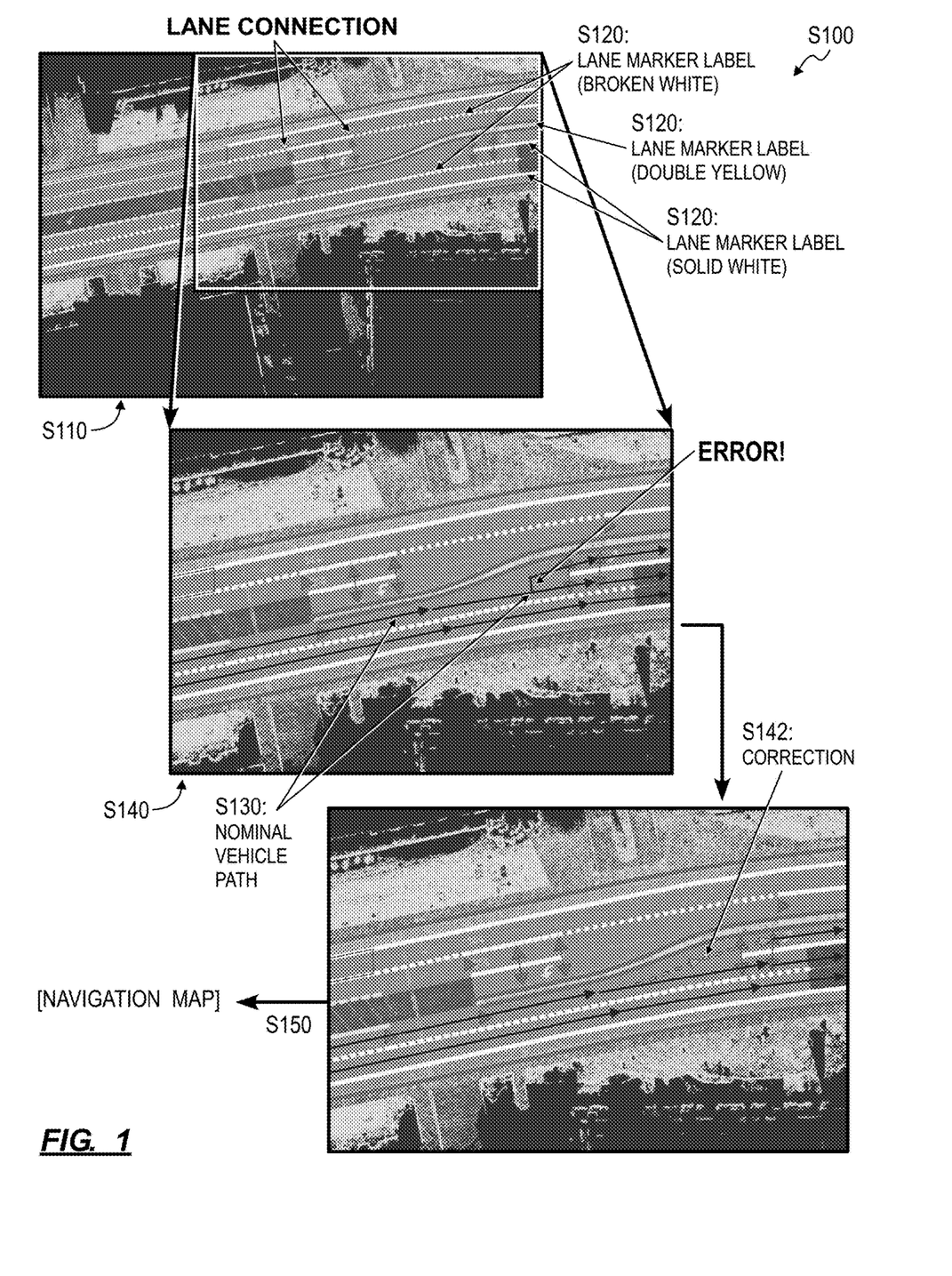
FIG. 1 is a flowchart representation of a method.

As shown in FIG. 1, a method S100 for calculating nominal vehicle paths for lanes within a geographic region includes: serving a digital frame of a road segment to an annotation portal in Block S110; at the annotation portal, receiving insertion of a lane marker label, for a lane marker represented in the digital frame, over the digital frame in Block S120; calculating a nominal vehicle path over the road segment based on the lane marker label in Block S130; at the annotation portal, rendering the nominal vehicle path over the digital frame in Block S140 and receiving manual adjustment of the nominal vehicle path by a human annotator in Block S142; and updating a navigation map for the road segment based on a final position of the nominal vehicle path in Block S150.

One variation of the method includes: serving a digital frame of a road segment to an annotation portal in Block S110; at the annotation portal, receiving insertion of a lane marker label, for a lane marker represented in the digital frame, over the digital frame in Block S120; calculating a nominal path over the road segment based on the lane marker label in Block S130; defining a virtual simulator environment for the road segment based on the lane marker label in Block S160; populating the virtual simulator environment with a virtual road vehicle and a set of virtual objects representing a set of real vehicles in Block S162; during a simulation, traversing the virtual road vehicle along the nominal path within the virtual simulator environment in Block S164 and scanning the virtual simulator environment for collisions between the virtual road vehicle and the set of virtual objects in Block S166; and, in response to detecting a collision between the virtual road vehicle and the set of virtual objects in the virtual simulator environment, flagging the road segment for review in Block S168.

Another variation of the method includes: serving a digital frame of a road segment to an annotation portal in Block S110; at the annotation portal, receiving insertion of a lane marker label, for a lane marker represented in the digital frame, over the digital frame in Block S120; calculating a nominal path over the road segment based on the lane marker label in Block S130; defining a virtual simulator environment for the road segment based on the lane marker label; during a simulation, traversing the virtual road vehicle along the nominal path within the virtual simulator environment and scanning the virtual simulator environment for collisions between the virtual road vehicle and virtual objects within the virtual simulator environment; and, in response to absence of a collision between the virtual road vehicle and virtual objects in the virtual simulator environment, updating a navigation map for the road segment with the nominal path.

Yet another variation of the method includes: serving a digital frame of a road segment to an annotation portal in Block S110; at the annotation portal, receiving insertion of a lane marker label, for a lane marker represented in the digital frame, over the digital frame in Block S120; calculating a nominal path over the road segment based on the lane marker label in Block S130; characterizing motion of a representative vehicle traversing the nominal path according to a physics model of a road vehicle; and, in response to characterized motion of the representative vehicle traversing the nominal path falling within motion limitations assigned to autonomous vehicles, updating a navigation map for the road segment based on the nominal path in Block S150.

2. Applications

Generally, Blocks of the method S100 can be executed by a computer system to: access sensor data, such as LIDAR and/or color camera images, collected by vehicles traversing road segments; to serve a digital frame of a road segment to a human annotator via an annotation portal; to receive manual insertion of lane marker labels onto the digital frame; to automatically construct a road network representing lane connections and nominal vehicle paths between multiple lanes in multiple directions based on lane marker labels inserted by the human annotator; to serve a visual representation of these nominal vehicle paths within the road segment represented by the digital frame—such as in real-time—to the annotation portal for confirmation or adjustment of the calculated lane connections and nominal vehicle paths; and to update a navigation map accordingly.

2.1 Applications: Lane Map

The computer system can: host an annotation portal; and serve LIDAR and/or color camera frames of road segments within a geographic region—recorded via sensors arranged on manually-operated vehicles deployed to this geographic region—to the annotation portal for manual insertion of lane marker labels over corresponding regions of these frames by a human annotator. The computer system can then implement a lane connection model to generate a lane connection graph representing distinct lanes, intersections, lane mergers, and lane divisions within this road segment.

The computer system can also calculate a nominal vehicle path for each lane, intersection, lane merger, etc. within this road segment. For example, the computer system can: center the nominal vehicle path between two adjacent curvilinear lane marker labels; offset the nominal vehicle path from a left or right lane marker by a preset offset distance; and/or apply a physics model of a four-wheeled road vehicle to calculate a nominal vehicle path that maintains the vehicle within this lane given a common or maximum track width of such vehicles. The annotation portal can render a nominal vehicle path for each lane over its corresponding lane segment within the road segment depicted in the frame, such as in (near) real-time as the human annotator places lane marker labels onto the frame, thereby enabling the human annotator to view, learn, and correct effects of lane marker label placement on automatic lane connection and nominal vehicle path calculation by the computer system.

The computer system can also interface with the human annotator via the annotation portal to enable the human annotator to flag or manually correct errors in the lane connection graph or in nominal vehicle paths, thereby: a) leveraging the human annotator's ability to rapidly visually identify and label lane markers in an optical image; b) leveraging the computer system's capacity to rapidly calculate nominal lane paths from vectorized lane marker labels; and c) leveraging the human annotator's ability to visually detect anomalous lane connections and nominal vehicle paths in order to quickly produce an accurate, low-error map of lanes along this road segment.

In particular, the method S100 can be executed by a computer system in conjunction with an annotation portal executing on a human annotator's local machine: to enable the human annotator to insert lane marker labels into sensor data of road segments; to automatically calculate lane connections and nominal vehicle paths based on these lane marker labels; and to serve these lane connections and nominal vehicle paths back to the annotator for confirmation or correction, thereby enabling the human annotator to quickly, visually grasp links between lane marker labels and navigation of an autonomous vehicle traversing these road segments and enabling the human annotator to flag and/or correct lane connection and nominal vehicle path errors.

The computer system can then: compile the lane connection graph and georeferenced nominal vehicle paths into a new navigation map; publish this new navigation map for deployed autonomous vehicles; and authorize autonomous vehicles in this geographic region to traverse lanes defined in this navigation map (approximately) according to nominal paths thus calculated for this road segment. Alternatively, the computer system can update an existing navigation map to reflect this lane connection graph and these georeferenced nominal vehicle paths and serve this updated navigation map to autonomous vehicles deployed to this geographic region. An autonomous vehicle executing a route through this road segment can then implement the navigation map to calculate a path between its current location and its assigned destination. For example, the autonomous vehicle can autonomously navigate along a lane segment defined within the navigation map and traverse a corresponding nominal path, such as with local deviations responsive to detected local vehicle traffic, pedestrian traffic, road debris, etc.

2.2 Applications: Simulation and Lane Map Check

Furthermore, the computer system can automatically test this lane connection graph for erroneous lane connections, intersections, lane mergers, and lane divisions within this road segment and can selectively interface with the human annotator to correct such errors before incorporating this lane connection graph and these nominal paths into a new or updated navigation map.

For example, the computer system can: generate a virtual simulator environment representing the road segment based on lane connections, intersections, lane mergers, and lane divisions specified over sensor data in the annotation portal by the human annotator; populate the virtual simulator environment with a virtual road vehicle; assign a nominal path calculated for this road segment to the virtual road vehicle within the virtual simulator environment; and populate the virtual simulator environment with virtual objects representing other vehicles, pedestrians, etc. and assigned trajectories based on historical or modeled motion of objects of these types. The computer system can then run a simulation within this virtual simulator environment and scan this simulation for collisions between the virtual road vehicle and other objects in the virtual simulator environment, which may indicate an erroneous lane connection, intersection, lane merger, or lane division. In particular, the computer system can: implement the same motion planning system—developed for an autonomous vehicle planned for deployment to this geographic region—to generate navigational commands responsive to lane connections and virtual objects within the virtual simulator environment to maintain the virtual road vehicle on or near the nominal path; autonomously navigate the virtual road vehicle through the virtual simulator environment according to these navigational commands; and continuously scan the virtual simulator environment for collisions between the virtual road vehicle and other objects in the virtual simulator environment. By thus implementing a motion planning system developed for autonomous vehicles, the computer system can simulate autonomous navigation though the road segment according to a lane connection graph quickly defined over the frame by the human annotator.

The computer system can also: perturb the nominal path assigned to the virtual road vehicle with the virtual simulator environment; modify constellations of other objects and their trajectories within the virtual simulator environment; run additional simulations with a virtual road vehicle moving along the same route through the road segment represented within the virtual simulator environment according to these nominal path and object changes; and scan these additional simulations for collisions between the virtual road vehicle and other objects in the virtual simulator environment.

If the computer system thus fails to detect a collision between the virtual road vehicle and these other objects, the computer system can automatically verify this lane connection graph and nominal path, update the navigation map, and publish this updated navigation map to deployed autonomous vehicles accordingly. In particular, responsive to verifying no collision between the virtual road vehicle and other objects in the virtual simulator environment thus defined according to this lane connection graph, the computer system can automatically verify the lane connection graph and update the navigation map accordingly, thereby both limiting total human involvement (e.g., both time and mental energy) necessary to generate a navigational map for a geographic region and ensuring a high degree of accuracy in new navigation maps (or navigation map updates).

The computer system can additionally or alternatively check a nominal path calculated for a lane segment in the road segment based on lane markers located over the frame by the human annotator and then either verify the nominal path or prompt the human annotator to edit the nominal path accordingly. For example, the computer system can implement a physics model and a speed limit along this road segment to predict lateral acceleration and rotational velocity of a road vehicle traversing this nominal path. In this example, the computer system can flag the nominal path for manual adjustment if the peak estimated lateral acceleration or peak estimated rotational velocity of the road vehicle traversing this nominal path exceeds threshold motion characteristics designated for road vehicles and then interface with the human annotator via the annotation portal to correct the nominal path. Additionally or alternatively, the computer system can flag the lane marker labels defining the distinct lane segment, intersection, lane merger, or lane division containing this nominal path within this road segment for correction by the human annotator responsive to the peak estimated lateral acceleration or peak estimated rotational velocity of the road vehicle traversing this nominal path exceeding threshold motion characteristics designated for road vehicles; the computer system can then interface with the human annotator via the annotation portal to adjust these lane marker labels accordingly.

As the human annotator modifies the lane marker labels over the frame and/or manually adjusts the nominal path, the computer system can repeat the foregoing methods and techniques to automatically recalculate and retest the lane connection graph and corresponding nominal paths.

Therefore, the computer system can execute Blocks of the method S100 to: interface with a human annotator via an annotation portal to locate lane marker labels over a frame depicting a road segment; automatically calculate a lane connection graph and nominal paths; implement a virtual simulator and physics model to automatically verify the lane connection graph and the nominal paths, respectively; and selectively prompt additional human annotator involvement to adjust lane marker labels and/or nominal paths when errors are thus detected. For example, the computer system can execute Blocks of the method S100 to streamline generation and verification of a lane connection graph and nominal paths for a road segment with minimal inputs from one human annotator rather than involve multiple human annotators to manually define and verify a lane connection graph and nominal paths within lane segments defined in this lane connection graph.

2.3 Applications: Local and Remote Computing

The method S100 is described below as executed by a computer system in conjunction with an instance of an annotation portal executing on a local machine (e.g., a desktop or laptop computer). However, Blocks of the method S100 can alternatively be implemented locally by the annotation portal or by any other local or remote computer device. Furthermore, the method S100 is described below as executed by the computer system and/or annotation portal to insert lane marker labels into LIDAR frames and to calculate nominal vehicle paths based on these lane marker labels; however, the computer system and/or annotation portal can alternatively insert lane marker labels into color camera frames or frames containing sensor data of other types and to calculate nominal vehicle paths based on these lane marker labels according to Blocks of the method S100.

3. Autonomous Vehicle

The method S100 can be executed by a computer system (e.g., a remote server) in conjunction with an autonomous vehicle. The autonomous vehicle can include: a suite of sensors configured to collect information about the autonomous vehicle's environment; local memory storing a navigation map defining lane connections and nominal vehicle paths for a road segment and a localization map that the autonomous vehicle implements to determine its location in real space; and a controller. The controller can: calculate a nominal path between the autonomous vehicle's current location and a destination based on the navigation map; determine the location of the autonomous vehicle in real space over time based on sensor data collected from the suite of sensors and the localization map; determine the context of a scene around the autonomous vehicle based on these sensor data; elect a future action (e.g., a navigational decision) to remain on or deviate from the nominal path based on the context of the scene around the autonomous vehicle and the real geospatial location of the autonomous vehicle; and control actuators within the vehicle (e.g., accelerator, brake, and steering actuators) according to elected decisions.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between the LIDAR sensor and external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, left lateral, and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle.

The autonomous vehicle can also implement one or more local neural networks to process LIDAR feeds (i.e., sequences of LIDAR images), video feeds (or sequences of color photographic images), and/or other sensor data substantially in real-time in order to localize the autonomous vehicle to a known location and orientation in real space, to interpret (or "perceive") its surroundings, and to then select and execute navigational actions. For example, a controller integrated into the autonomous vehicle can: pass LIDAR and video feeds into a localization/perception neural network to detect and characterize static objects—such as lane markers, lane reflectors, curbs, road signs, telephone poles, and building facades—near the autonomous vehicle substantially in real-time; and then compare types and relative locations of these static objects to a localization map to determine the autonomous vehicle's position in real space. In this example, the neural network can also detect and characterize dynamic objects—such as other vehicles, pedestrians, and cyclists—in the LIDAR and video feeds; and the controller can perceive the autonomous vehicle's local environment based on proximity, speed, and types of these nearby dynamic objects. The controller can then select a next navigational action—such as including a target wheel angle, road speed, acceleration, or deceleration (e.g., brake position)—to move toward a specified destination based on the autonomous vehicle's current position and the scene around the vehicle, such as by passing the autonomous vehicle's position, identified dynamic objects in the local scene, and the autonomous vehicle's destination into a navigational model (e.g., a navigating neural network).

The autonomous vehicle can therefore implement one or more neural networks locally to determine its location, perceive its surroundings, and select future actions. The computer system can implement Blocks of the method S100: to collect LIDAR, video, and/or other sensor data from the autonomous vehicle, other autonomous vehicles, and/or manually-operated road vehicles with similar sensor suites; to interface with human annotators to attribute localization-, perception-, and motion planning-related labels to these sensor data; and to generate and refine localization/perception, navigational, and/or other neural networks—for implementation by these autonomous vehicles—over time.

The method S100 is described herein as executed in conjunction with an autonomous ground-based passenger, commercial, or fleet vehicle. However, Blocks of the method S100 can be executed in conjunction with a vehicle of any other type.

4. Annotation Portal

The computer system can serve LIDAR and/or color camera frames to the annotation portal—executing on a local computer system—via a computer network (e.g., the Internet) and can similarly receive definitions (e.g., geospatial locations and orientations) of lane marker labels inserted into these digital frames within the annotation portal via the computer network. For example, the annotation portal can: execute on a desktop computer; render a LIDAR frame representing a road segment for review by the human annotator; host tools for inserting lane marker labels onto the LIDAR frame; render curvilinear representations of nominal vehicle paths (automatically calculated by the computer system or by the annotation portal) or animations of vehicles traversing nominal vehicle paths over the LIDAR frame in response to lane marker labels placed on the LIDAR frame; and host tools for flagging or correcting erroneous lane marker labels and nominal vehicle paths rendered over the LIDAR frame. (In this example, the road segment can be selected from a greater geographic region, such as manually by a human annotator or automatically by the computer system.)

However, the annotation portal can execute on the human annotator's machine or other local computer system of any other type to enable a human annotator to label LIDAR or color camera frames in any other way.

5. Sensor Data

Block S110 of the method S100 recites serving a digital frame of a road segment to an annotation portal. Generally, in Block S110, the computer system serves a LIDAR (or color camera) frame to the annotation portal for manual insertion of lane marker labels over corresponding regions of the LIDAR frame.

5.1 Sensor Data Source

In Block S110, the computer system can access LIDAR data recorded by LIDAR sensors—integrated into road vehicles—while these road vehicles were operated within a geographic region.

In one implementation, prior to deploying a fleet of autonomous vehicles to a new geographic region, a road vehicle outfitted with LIDAR sensors and cameras (e.g., an autonomous vehicle in this fleet) can be manually driven along roads throughout this geographic region, and these sensors can record sensor data representing road segments and nearby surfaces throughout this geographic region. The computer system can thus execute Blocks of the method S100 and interface with the human annotator to label lane markers in sensor data recorded by the road vehicle while traversing roads within this geographic region, to generate a lane connection graph and nominal paths for this geographic region, and to test the lane connection graphs and nominal paths before publishing a navigation map for this geographic region and authorizing autonomous operation of autonomous vehicles within the geographic region according to this navigation map.

A road vehicle can be similarly manually-driven along a particular road segment following road construction in order to collect sensor data representing this particular road segment and surfaces nearby. The computer system can thus execute Blocks of the method S100 and interface with the human annotator to label lane markers in sensor data recorded by the road vehicle while traversing this road segment, to update a lane connection graph and nominal path for this particular road segment, and to test the lane connection graph update and nominal path before publishing a navigation map update for this particular road segment and authorizing autonomous operation of autonomous vehicles along this particular road segment according to the updated navigation map.

Furthermore, an autonomous vehicle operating within a geographic region can record and process sensor data to inform autonomous operation. The autonomous vehicle can also detect a change in location of a lane marker (e.g., if lane markers along the road segment have been repainted) or a change in another immutable object (e.g., a change in position of a traffic barrier) along a particular road segment from objects recorded in a navigation map or localization map. Responsive to the autonomous vehicle detecting this change, the computer system can execute Blocks of the method S100 and interface with the human annotator to label lane markers along this particular road segment based on sensor data recorded by the autonomous vehicle while traversing this road segment, to update a lane connection graph and nominal path for this particular road segment, and to test the lane connection graph update and nominal path before publishing a navigation map update for this particular road segment and authorizing autonomous operation of autonomous vehicles along this particular road segment according to the updated navigation map.

5.2 Sensor Data Preparation

Once the computer system accesses these LIDAR data, the computer system can stitch these LIDAR data into a 3D point cloud or 2D heightmap representing road segments and surfaces (e.g., sidewalks, buildings, road signs, trees, traffic barriers, etc.) near these road segments within the geographic region. The computer system can also compress this 3D representation of the geographic region into a 2D LIDAR plan map image (i.e., an "overhead" map) of road segments within this geographic region. The computer system can also filter the LIDAR feed (or composite LIDAR feed) to reduce its size and/or to improve visual comprehension for a human annotator (e.g., to reduce volume of data transmission and increase label quality). For example, each optical image in the LIDAR feed can include a dense three-dimensional point cloud representing external surfaces proximal the road vehicle at a time the optical image was recorded by the LIDAR sensor. To prepare the LIDAR feed to be annotated with lark markers, the computer system can: separate ground points from the LIDAR feed; and project the ground points onto a horizontal plane to form a sparse two-dimensional plan (i.e., overhead) point cloud representing a road and nearby ground surfaces.

(Similarly, to prepare the LIDAR feed to be annotated with vehicle markers, the computer system can: remove a subset of points representing a ground surface (e.g., a "ground plane") from the first optical image; remove points two meters above the ground plane to remove overhead branches, vegetation, wires, etc. from the LIDAR feed; and filter out noise and dense clusters of points from the remaining point cloud to produce a sparse three-dimensional point cloud of surfaces likely to represent nearby vehicles. The computer system can then compress the lower-density three-dimensional point cloud onto a horizontal plane to form a sparse two-dimensional plan (i.e., overhead) point cloud containing a fraction of the data in the original optical image but that may be more easily interpreted and labeled by a human annotator.)

(The computer system can additionally or alternatively access sensor data—such as LIDAR scans and color video feeds—from other ground-based and/or aerial vehicle(s) and implement similar methods to pre-process these sensor data.)

5.3 Road Segment Annotation Selection

Figure 2:
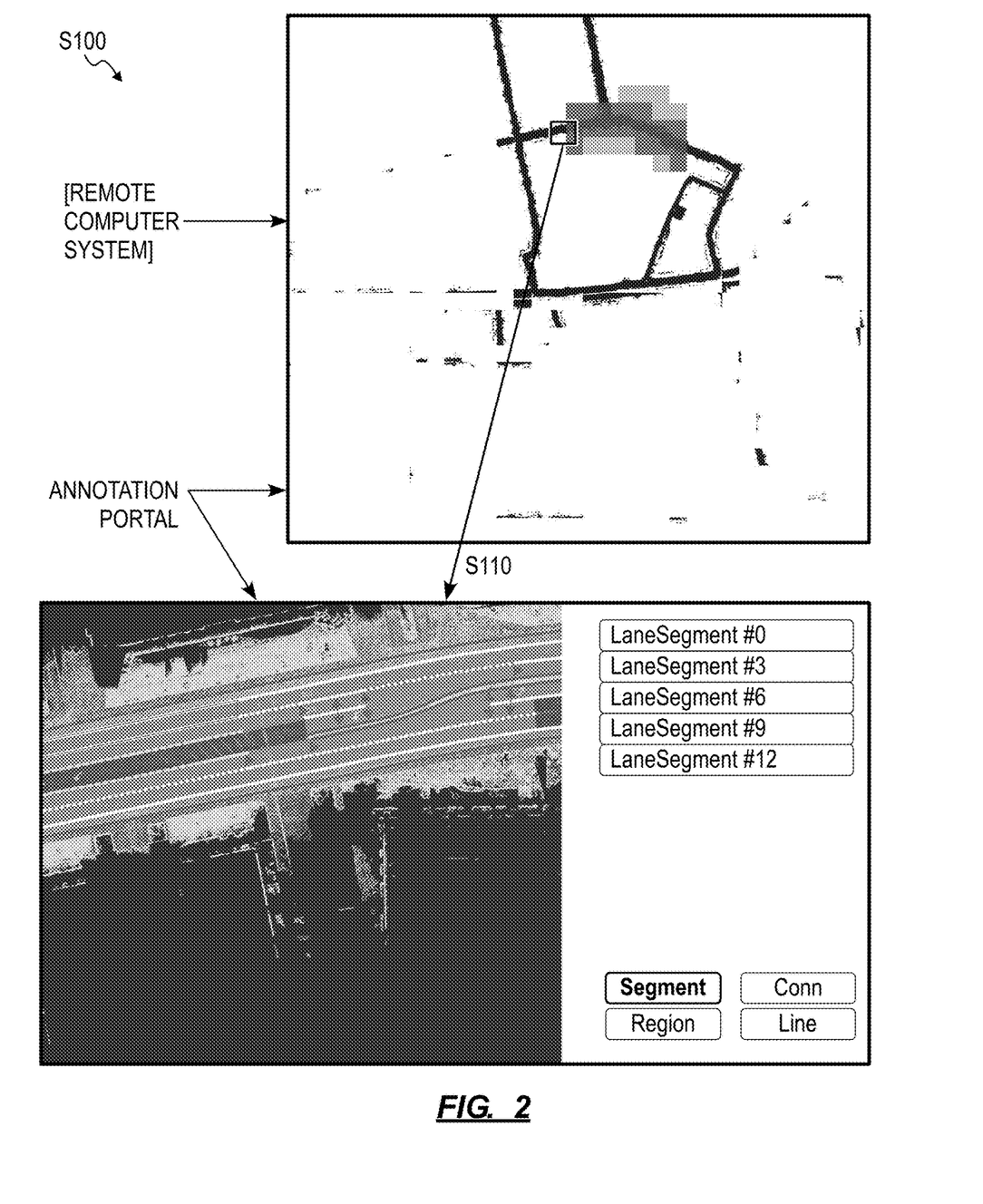
FIG. 2 is a graphical representation of one variation of the method.
Figure 3:
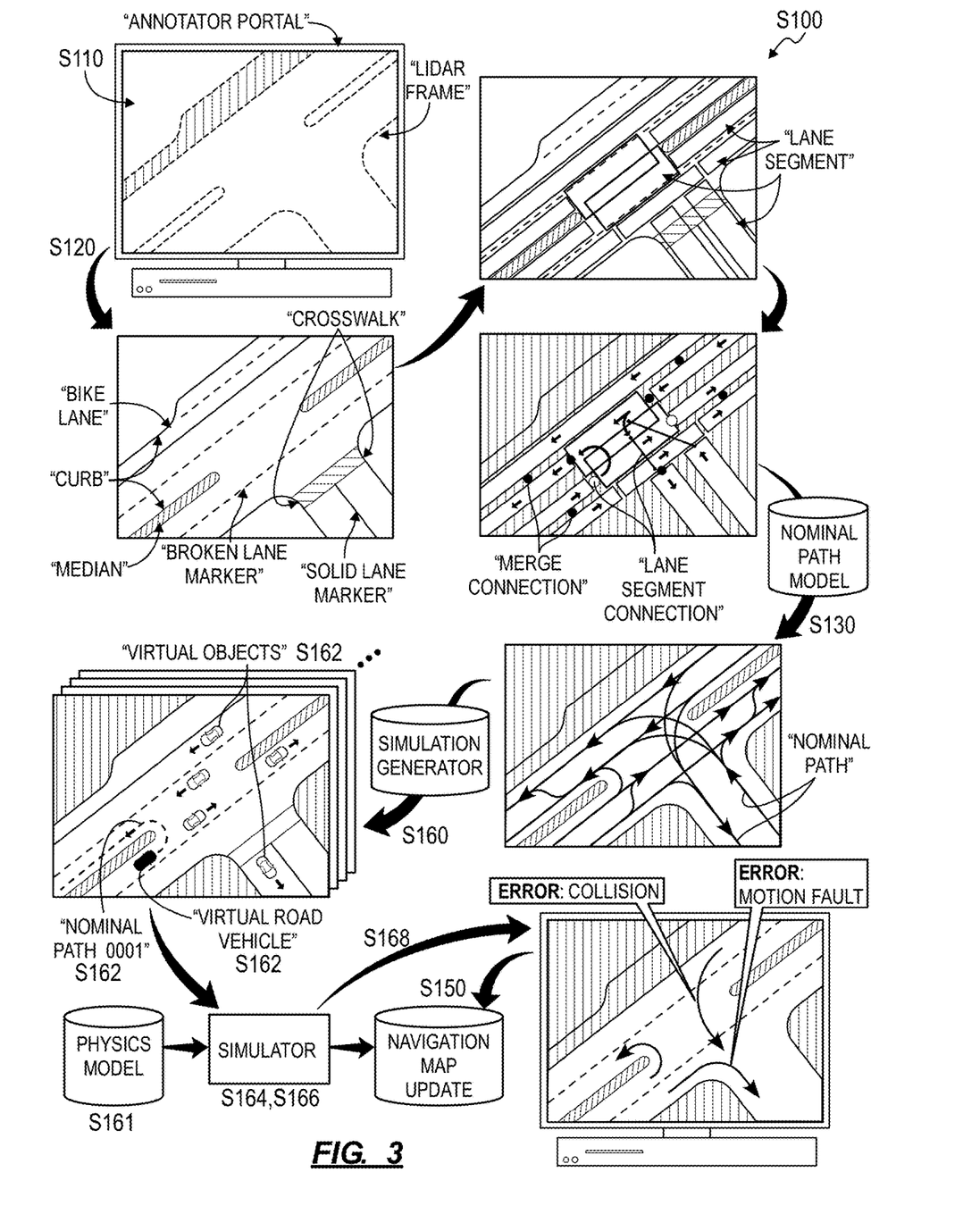
FIG. 3 is a flowchart representation of one variation of the method.

As lane marker labels are inserted onto road segments within this geographic region by various human annotators through various instances of the annotation portal over time, the computer system can update this 2D LIDAR plan map to represent presence and/or density of lane marker labels within this geographic region. For example, the computer system can generate a colored heatmap layer representing density of lane marker labels or representing ages of newest lane marker labels available for road segments within this geographic region, as shown in FIG. 2. By overlaying the heatmap layer over the 2D LIDAR plan map, the computer system can visually indicate road segments that have been mapped within a geographic region, whether lane marker labels for these road segments are available, whether lane annotations for these road segments have been reviewed (e.g., by another human annotator or reviewer), and whether these lane marker labels realize certain conditions, such as at least a minimum density of lane marker labels per road distance or a maximum lane marker label age.

The computer system can serve a form of this 2D LIDAR plan map to the annotation portal, such as a compressed or sparse version of the 2D LIDAR plan map. A human annotator interfacing within the annotation portal can then select a region (e.g., a "tile") within the compressed 2D LIDAR plan map, such as a region of the compressed 2D LIDAR plan map for which limited or no current lane marker labels are available, such as indicated by the overlaid heatmap layer. The computer system can then return a segment of the 2D LIDAR plan map selected by the human annotator (hereinafter the "LIDAR frame") to the annotation portal in Block S110.

Alternatively, the computer system can automatically select a segment of the 2D LIDAR plan map for annotation by the human annotator. For example, the computer system can prioritize annotation of road segments depicted in the 2D LIDAR plan map: inversely proportional to a number of human annotators who previously annotated these road segments; proportional to traffic density along these road segments; and/or proportional to a predicted or measured frequency that routes assigned to autonomous vehicles deployed in the geographic region will or do intersect these road segments.

Yet alternatively, in the foregoing implementations, the computer system can: compile 3D LIDAR frames recorded by a road vehicle traversing roads in the geographic region into a 3D point cloud representing road segments and nearby surfaces in the geographic region; and serve a segment of this 3D point cloud—such as representing a discrete road segment or a particular intersection in this geographic region—to the annotation portal in Block S110. The human annotator can then annotate this 3D point cloud with lane marker labels in Block S120, as described below. Additionally or alternatively, the computer system can: compile 2D color photographic images recorded by a road vehicle traversing roads in the geographic region into a photographic representation (e.g., a 2D plan representation) of road segments and nearby surfaces in the geographic region; and serve a segment of this photographic representation—such as depicting a discrete road segment or a particular intersection in this geographic region—to the annotation portal in Block S110. The human annotator can then annotate this photographic representation with lane marker labels in Block S120, as described below. However, the computer system can compile sensor data collected by a road vehicle operating in the geographic region into any other format and can serve a segment of this sensor data to the annotation portal for manual annotation by the human annotator in any other way.

6. Lane Marker Insertion

Block S120 of the method S100 recites, at the annotation portal, receiving insertion of a lane marker label, for a lane marker represented in the digital frame, over the digital frame. Generally, in Block S120, the annotation portal can record a position and orientation of a lane marker label, such as relative to geospatial coordinates, based on selection of one or more points or pixels representing real lane markers in the LIDAR frame.

In one implementation, the human annotator selects a set of (e.g., two or more) pixels or points in the LIDAR frame. The annotation portal then: calculates a smooth curvilinear line that extends between these pixels or points; stores geospatial coordinates and georeferenced orientations of vertices of the curvilinear line; calculates georeferenced orientations of tangent lines representing this curvilinear line, such as at each vertex; and overlays a lane marker label defined by this curvilinear line over the LIDAR frame and intersecting pixels or points selected by the human annotator. The annotation portal can repeat this process to recalculate the lane marker label in real-time as the human annotator adds, deletes, and/or moves vertices of the lane marker label.

In this foregoing implementation, the annotation portal can render a menu of various lane marker types, such as including: a single solid white line; a single broken white line; a double solid white line; a double solid-broken white line; a single solid yellow line; a single broken yellow line; a double solid yellow line; a double solid broken yellow line; etc. The human annotator can select from this menu to activate a particular lane marker type before or after placing a lane marker label onto the LIDAR frame; and the annotation portal can write this lane marker type to the lane marker label and render the lane marker label according to this lane marker type on the LIDAR frame, as shown in FIG. 1.

Similarly, the annotation portal can render a menu of various lane types, such as including: speed limit; left turn lane; right turn later; bi-directional lane; etc. The human annotator can select from this menu to activate a particular lane type for a lane segment in the LIDAR frame; and the annotation portal can write this lane type to the lane segment and render the lane segment according to this lane type, such as by applying a color filter over the lane segment in the LIDAR frame.

The annotation portal (or the computer system) can also assign navigation rules to nominal vehicle paths calculated in Block S130 based on these lane marker type and lane type labels.

6.1 Other Annotation Labels

The annotation portal can also host other annotation labels, such as curb, crosswalk, sidewalk, and bike lane marker labels. The human annotator may selectively place these other annotation labels in the LIDAR frame; and the computer system can implement methods and techniques described above and below to define crosswalk segments, sidewalk segments, bike lane segments, etc. The human annotator may thus specify connections between bike lane segments and/or between crosswalk segments and sidewalk segments; and the computer system can calculate a bike lane network and a separate pedestrian lane network accordingly. Furthermore, the computer system can define a "rigid" lane segment boundary based on an adjacent curb label located on the LIDAR frame by the human annotator—such as compared to a "flexible" lane segment boundary for a lane segment adjacent a shoulder or bike lane. The computer system can then incorporate these additional road segment features in a simulation, as described below, in order to simulate an autonomous vehicle moving through the road segment and to test for collisions further in the context of bike lanes, pedestrian lanes, curbs, etc. in this road segment. The computer system can additionally or alternatively calculate nominal paths through this road segment, as described below, further in the context of these bike lanes, pedestrian lanes, curbs, etc., such as to avoid entry of an autonomous vehicle into bike lanes and to maintain a minimum offset between the autonomous vehicle and curbs within this road segment when the autonomous vehicle executes these nominal paths.

7. Nominal Vehicle Path Calculation

Block S130 of the method S100 recites calculating a nominal vehicle path over the road segment based on the lane marker label. Generally, in Block S130, the computer system (or the annotation portal) can calculate multiple (e.g., many, all) possible nominal vehicle paths along all lane segments, intersections, merging lane segments, and splitting lane segments in multiple (e.g., all) directions based on lane marker labels and lane markers types inserted over the LIDAR frame.

For example, the computer system (or the annotation portal) can calculate a nominal vehicle path for each lane segment depicted in the LIDAR frame based on two or more approximately parallel and offset lane marker labels defining this lane segment. The computer system (or the annotation portal) can similarly: calculate a set of nominal paths from one lane segment into multiple discrete lane segments, such as from one lane segment into each of left, right, and/or straight lane segments at an intersection or from one lane segment into two lane segments at a lane split; and calculate a set of nominal paths from multiple lane segments into one lane segment, such as left turn, right turn, and/or straight lane segments into one lane segment at an intersection or from two lane segments into one lane segment at a lane merger.

7.1 Lane Connection Graph

In one implementation, the computer system implements a lane connection model to transform lane marker labels into a lane connection graph for road segments represented in the LIDAR frame. For example, the computer system can: identify a yellow lane marker label, such as a double-solid or solid-broken lane marker label; aggregate a first group of approximately-parallel white lane marker labels on a first side of the yellow lane marker label as representing lanes in a first direction; and aggregate a second group of approximately-parallel white lane marker labels on a second side of the yellow lane marker label as representing lane segments in a second direction opposite the first direction. The computer system can then delineate lane segments on each side of the yellow lane marker label based on additional white solid or broken lane marker labels in the first and second groups, respectively. The computer system can implement this process for each group of nearly-parallel white lane marker labels uninterrupted in their longitudinal direction by a yellow lane marker label to identify singular lane segments, sets of lane segments, merging lane segments, and/or splitting lane segments on each side of yellow lane marker labels within the LIDAR frame.

The computer system can also detect intersections, such as proximal terminuses of yellow lane marker labels or proximal discontinuous junction lane marker labels of the same type (e.g., solid white) inserted into the LIDAR frame. For example, for an intersection in which lane markers do not extend into the intersection (e.g., a four-way intersection), the computer system can extend lane segments detected on one side of the intersection linearly to the opposite side of the intersection to connect to lane segments detected on this second side of the intersection. The computer system can similarly: project right-turn lane segments along sweeping solid white lane marker labels at outer corners of such intersections detected in the LIDAR frame; and project left-turn lane segments from immediately-right of solid yellow lane marker labels in one traffic direction to a lane segment right of a solid yellow lane marker label and extending approximately perpendicular to this traffic direction. (Alternatively, the human annotator can explicitly indicate connections between lane segments across an intersection within the annotation portal, and the computer system can then automatically compute a nominal vehicle path through the intersection accordingly.)

The computer system can implement similar methods and techniques: to identify two, three, four, and greater-order intersections with one or more lane segments in each direction; to identify one or more distinct left-turn lane segments in each direction at an intersection; to link straight lane segments on each side of an intersection; to link discrete or contiguous left-turn lane segments to straight lane segments extending approximately perpendicular and to the left of these left-turn lane segments via implied lane segments curving to the left through the intersection; to link discrete, protected or unprotected right-turn lane segments to straight lane segments extending approximately perpendicular and to the right of these right-turn lane segments; to identify merging lane segments along one traffic direction; to identify splitting lane segments along one traffic direction; etc. The computer system can aggregate the interpreted lane segments—generally bounded on each side by a lane marker label outside of intersections—and their interpreted straight, left, and right connections at intersection into a lane connection graph.

In the foregoing implementations, the computer system can implement a lane connection model that includes a neural network or other artificial intelligence trained on maps (e.g., LIDAR maps) of roadways labeled with connections between primary turn lane segments, intersections, merging lane segments, and splitting lane segments, etc. and configured to automatically generate a lane connection graph for the current LIDAR frame based on lane marker labels inserted by the human annotator. Alternatively, the computer system can: retrieve existing third-party map data, such as collected from road or aerial vehicles; globally align third-party map data to the LIDAR map based on geospatial markers; locally align lane segments represented in these map data to lane marker labels in the LIDAR map; and then project lane connections from the third-party map data onto the LIDAR map to construct a lane connection graph for the LIDAR frame. However, the computer system can implement any other method or technique to generate a lane connection graph for the LIDAR frame currently under review by the human annotator at the annotation portal.

For each connection in the lane connection graph, the computer system can calculate a nominal vehicle path that, when traversed by a vehicle, maintains the vehicle within the bounds of its lane.

7.2 Geometric Lane Marker Label

In one implementation, for a particular lane segment represented in the lane connection graph, the computer system: calculates a line centered between two adjacent, approximately parallel, and offset lane marker labels; smooths this line, and stores this line as a nominal vehicle path for this particular lane segment. For example, the computer system can define this nominal vehicle path as a sequence of geospatial or georeferenced waypoints.

The computer system can thus implement a purely geometric model to calculate a nominal vehicle path for a lane segment defined by two adjacent, approximately parallel, and offset lane marker labels inserted in the LIDAR frame. The computer system repeats this process for each other lane segment and interpreted straight, left, and right connections represented in the lane connection graph.

7.3 Vehicle Physics

In a similar implementation, the computer system implements the foregoing methods to calculate a geometric line centered between two adjacent, approximately parallel, and offset lane marker labels within a road segment. The computer system also: accesses a vehicle physics model that simulates motion of road vehicles, such as a four-wheeled passenger or light freight road vehicle; retrieves a speed limit or the road segment from a speed limit database; and then implements the physics model to smooth the geometric line according to the vehicle physics model such that all wheels of a four-wheeled passenger vehicle of common track width traversing this geometric line at the speed limit of the road segment remains fully inside the bounds of the lane marker labels that bound this lane segment.

The computer system can thus implement a vehicle physics model to further refine a geometric path to accommodate for motion characteristics of an autonomous vehicle that may traverse the nominal vehicle path during autonomous operation.

7.4 Path Planning AI

In yet another implementation, the computer system implements a path planning model (e.g., a neural network or other artificial intelligence) to calculate a nominal path for each lane segment and interpreted straight, left, and right connections represented in the lane connection graph. For example, for a first lane segment connecting to a second lane segment—approximately perpendicular to the first lane segment—represented in the lane connection graph, the computer system can implement the path planning model to calculate a nominal vehicle path: centered between two lane marker labels defining the first lane segment; swinging slightly left upon approach to the second lane segment (e.g., to avoid a curb or to signal to other drivers nearby an intent to turn right at the approaching corner); curving right to the center of the second lane segment according to a vehicle physics model and to avoid an outside curb at the corner; and centered between two lane marker labels defining the second lane segment upon exit from the right turn.

The computer system can thus implement a path planning model that adds an additional layer of complexity to geometric- and vehicle physics-based nominal vehicle path calculation, such as to incorporate signaling to other drivers nearby through second-order motion of the vehicle or to calculate a nominal vehicle path that enables greater carry-through speed of a vehicle through a turn, thereby reducing brake load and increasing vehicle efficiency without discomfort to passengers in the vehicle.

7.5 Aerial Images

In another implementation, the computer system calculates a nominal vehicle path for a lane segment based on data extracted from aerial images of road segments. In one example, the computer system: accesses an aerial image of a road segment represented in the LIDAR frame currently under review at the annotation portal; projects two adjacent, approximately parallel, and offset lane marker labels inserted into the LIDAR frame by the human annotator onto the aerial image; implements computer vision techniques to detect tire marks (e.g., "bedded-in" regions) within a lane segment of the aerial image bounded by these lane marker labels; compiles (e.g., averages) these tire marks into a single nominal vehicle path for this lane segment, such as weighted according to opacity or blackness of these tire marks; smooths the nominal vehicle path, such as described above; and projects this nominal vehicle path back onto the LIDAR frame.

However, the computer system can implement any other methods or techniques to detect tires marks within a lane segment represented in an aerial image and to calculate a nominal vehicle path based on these tire marks.

7.6 Historical Vehicle Paths

In another implementation, the computer system calculates a nominal vehicle path for a lane segment based on historical motion data of vehicles that previously traversed the lane segment. In one example, the computer system: calculates a georeferenced area bounded by two adjacent, substantially parallel, and offset lane marker labels inserted into the LIDAR map; retrieves—from a vehicle motion database—actual paths of vehicles traveling through this georeferenced area in the past; and compiles (e.g., averages) these paths to calculate a single nominal path for a lane segment bounded by these two lane marker labels.

However, the computer system can leverage historical vehicle motion data in any other way to calculate a nominal vehicle path for a particular lane segment defined by two or more lane marker labels inserted into the LIDAR frame by the human annotator.

The computer system can implement any of the foregoing process for each other lane segment and interpreted straight, left, and right connections defined by two or more lane marker labels inserted into the LIDAR frame and represented in the lane connection graph, such as in real-time as the human annotator inserts lane marker labels into the LIDAR frame or once the human annotator has completed annotation of a road segment or all road segments represented in the LIDAR frame.

8. Annotator Feedback

Block S140 of the method S100 recites, at the annotation portal, rendering the nominal vehicle path over the digital frame; and Block S142 of the method S100 recites receiving manual adjustment of the nominal vehicle path by a human annotator. Generally, in Blocks S140 and S142, the annotation portal can overlay a representation of a nominal vehicle path—calculated in Block S130—over a road segment in the LIDAR image and then collect feedback regarding accuracy of the nominal vehicle path from the human annotator.

In one implementation, the annotation portal renders a colored (e.g., red, green) line representing the nominal vehicle path over its corresponding location between two adjacent, approximately parallel, and offset lane marker labels in the LIDAR frame, such as with one or multiple arrowheads pointing in the direction of traffic for the road segment. In this implementation, the annotation portal can similarly render multiple colored lines—representing each of multiple discrete, intersecting, merging, and splitting nominal vehicle paths defined in the lane connection graph—over the LIDAR frame as the human annotator inserts lane marker labels, thereby enabling the human annotator to review construction of a network of nominal vehicle paths within this geographic region in near real-time. The annotation portal can additionally or alternatively render an animation of a virtual vehicle traversing a nominal vehicle path over the LIDAR map in Block S140. However, the annotation portal can visually communicate a nominal vehicle path in any other way in Block S140.

The annotation portal can then enable the human annotator to correct erroneous nominal vehicle paths and then trigger the computer system to recalculate (or locally recalculate) this nominal vehicle path accordingly. In particular, because the target output of the computer system and annotation portal executing the method S100 is a network of discrete, intersecting, merging, and splitting nominal vehicle paths within a geographic region, the annotation portal can: render initial calculated nominal vehicle paths over the LIDAR frame in Block S140; and enable the human annotator to flag or correct certain erroneous nominal vehicle paths directly in Block S142. In one example shown in FIG. 1, upon identifying an erroneous nominal vehicle path, the human annotator can select a nominal vehicle path and drag a vertex of the nominal vehicle path into a correct position over a lane segment represented in the LIDAR map. The annotation portal can also: implement snap functions to enable the human annotator to move and reconnect (e.g., "snap") this erroneous nominal vehicle path to another correct nominal vehicle path nearby; and/or implement manual drawing tools to enable the human annotator to delete and manually redraw all or part of the erroneous nominal vehicle path over the LIDAR frame. Once the human annotator has manually corrected the erroneous nominal vehicle path, the computer system (or the annotation portal locally) can implement a smoothing function, vehicle physics model, or path planning model, as described above, to further refine this nominal vehicle path.

In another example, the annotation portal can render both lane marker labels and nominal vehicle paths over the LIDAR frame. Upon identifying an erroneous nominal vehicle path, the human annotator can correct an adjacent lane marker label, such as by dragging a vertex of the lane marker label into a more correct position over the LIDAR frame. The computer system (or the annotation portal) can then recalculate this nominal vehicle path and nominal vehicle paths nearby, as in Block S130 described above, based on this manual change to the lane marker label.

The annotation portal can repeat this process for the same and other nominal vehicle paths overlaid on the LIDAR frame until the human annotator confirms that all nominal vehicle paths are correct. However, the annotation portal and/or computer system can interface with the human annotator in any other way to refine or confirm such nominal vehicle paths.

9. Nominal Vehicle Path Confirmation

Block S150 of the method S100 recites updating a navigation map for the road segment based on a final position of the nominal vehicle path confirmed by the human annotator. Generally, in Block S150, the computer system can update a navigation map defining a network of discrete, intersecting, merging, and splitting nominal vehicle paths over a geographic region with nominal vehicle paths calculated for the current LIDAR frame under review by the human annotator in Block S150 once the human annotator confirms these nominal vehicle paths. For example, if confirmed nominal vehicle paths for the same lane segment in the same geographic region currently exist, the computer system can compile the existing and new nominal vehicle paths for this lane segment, such as by averaging these nominal vehicle paths, calculating a combination of these nominal vehicle paths with greatest weight applied to the most-recent nominal vehicle path for this lane segment, or implementing other methods to interpolate between two or more nominal vehicle paths.

The computer system can then push all or a relevant portion of this updated navigation map to autonomous vehicles in the field, such as autonomous vehicles currently within a threshold distance (e.g., 30 miles) of this lane segment or that commonly traverse this road segment or road segments nearby.

10. Simulation

One variation of the method S100 includes: defining a virtual simulator environment for the road segment based on the lane marker label in Block S160; populating the virtual simulator environment with a virtual road vehicle and with a set of virtual objects representing a set of real vehicles in Block S162; traversing the virtual road vehicle along the nominal path within the virtual simulator environment in Block S164 and scanning the virtual simulator environment for collisions between the virtual road vehicle and the set of virtual objects in Block S166 during a simulation; and, in response to detecting a collision between the virtual road vehicle and the set of virtual objects in the virtual simulator environment, flagging the road segment for review in Block S168. Generally, in this variation, the computer system (or the annotation portal) can: construct a virtual simulator environment representing a road segment based on lane marker labels inserted over the LIDAR frame by the human annotator; populate the virtual simulator environment with a virtual road vehicle assigned a route along or approximating the nominal path; populate the virtual simulator environment with other virtual objects representing other road vehicles, pedestrians, etc.; and then execute a simulation within the virtual simulator environment to verify feasibility of lane connections and corresponding nominal paths defined within this road segment. In particular, the computer system (or the annotation portal) can: automatically generate a virtual simulator environment based on lane marker labels inserted over the LIDAR frame by the human annotator; and then implement a path planning system—developed for real autonomous vehicles—to navigate the virtual road vehicle through the virtual simulator environment in order to confirm whether an autonomous vehicle executing this path planning system may reliably navigate through lane segments and lane connections within this road segment.

Responsive to absence of collisions between the virtual road vehicle and other virtual objects in the virtual simulator environment, the computer system can verify these lane connections and nominal paths, generate a new navigation map or update an existing navigation map with these lane connections and nominal paths, and then automatically authorize autonomous vehicles to operate autonomously within this road segment according to this new or updated navigation map. In particular, responsive to absence of collisions between the virtual road vehicle and other virtual objects in the virtual simulator environment during this simulation, the computer system can determine that lane connections and nominal paths—thus defined for this road segment according to lane marker labels placed by the human annotator—are valid for autonomous navigation through the road segment by an autonomous vehicle executing the path planning system.

10.1 Virtual Simulator Environment

As described above, as the human annotator adds lane marker labels over the LIDAR frame rendered within the annotation portal, the computer system can: automatically construct a lane network defining lane segments, intersections, lane mergers, and lane divisions within this road segment; and calculate a network of nominal paths along these lane segments, between these lane segments, and through the intersections. For example, the computer system can: define a set of lane segments within the road segment based on pairs of adjacent and offset lane marker labels located over the LIDAR frame by the human annotator; define connections between these lane segments; and calculate a set of nominal paths—each spanning multiple lane segments—based on connections between these lane segments. The computer system can then project this lane network into a virtual simulator environment in Block S160, select a nominal path through this lane network, insert a virtual road vehicle (representing a real autonomous vehicle) into the virtual simulator environment in Block S162, and assign the selected nominal path to this virtual road vehicle.

The computer system can also populate this virtual simulator environment with dynamic virtual objects representing real dynamic objects (e.g., vehicles, pedestrians, cyclists) that may be present in and around the road segment in real space in Block S162. For example, the computer system can: process a sequence of LIDAR frames and/or photographic images recorded by a road vehicle that previously operated within this road segment to derive types, locations, and trajectories of objects that previously moved though this road segment; and populate the virtual simulator environment with like virtual objects moving through similar virtual trajectories within the virtual simulator environment. Similarly, the computer system can: implement a perception model to detect mutable objects within the sequence of LIDAR frames; assemble points in a sequence of LIDAR frames—recorded previously by the road vehicle moving through the road segment—corresponding to immutable objects into a three-dimensional point cloud representing roads within the geographic region; and populate the virtual simulator environment with a set of virtual objects based on types of mutable objects detected within the sequence of LIDAR frames and moving according to trajectories of these mutable objects. Alternatively, the computer system can interface with the same or other human annotator to receive manual annotation of these mutable objects and their trajectories through the road segment.

In another example, the computer system can implement a virtual object model to populate the virtual simulator environment with a constellation of virtual objects representing road vehicles, pedestrians, and/or cyclists, etc. and then assign trajectories to each of these virtual objects based on the lane network and physics models for types of these virtual objects.

In the foregoing examples, the computer system can also implement artificial intelligence, machine learning, regression techniques, statistical methods, and/or other methods to characterize driving behaviors of humans generally or of humans driving vehicles within this particular road segment, such as based on existing traffic data for this geographic region and sensor data collected by vehicles operating within this geographic region. When the simulation is activated, the computer system can then modify trajectories (or actions more generally) of these virtual objects within the virtual simulator environment responsive to actions by the virtual road vehicle—and vice versa—based on this characterization of driving behaviors within this road segment or throughout this geographic region more generally.

However, the computer system can implement any other method or technique to generate a virtual simulator environment representing the road segment, to populate the virtual simulator environment with representations of an autonomous vehicle and other objects commonly occurring in and near this road segment, and to assign trajectories to these virtual objects.

The computer system can also populate the virtual simulator environment with static objects present within and near the road segment, such as road signs, curbs, trees, buildings, traffic barriers, etc. For example, the computer system can populate the virtual simulator environment with a traffic signal, assign timed states to this traffic signal, and synchronize trajectories of virtual objects in the virtual simulator environment to states of the traffic signal. In another example, in which the human annotator notes sidewalks within the road segment by locating sidewalk marker labels over the LIDAR frame, the computer system can populate the virtual simulator environment with a curb between a lane segment and an adjacent sidewalk; the computer system can also locate sidewalk ramps within the virtual simulator environment based on crosswalk marker labels and sidewalk-crosswalk connections inserted over the LIDAR frame by the human annotator.

Therefore, the virtual simulator environment may: contain virtual static objects that represent real immutable objects (e.g., lane markers, curbs, traffic signals, buildings) within a geographic region; contain virtual representations of pedestrians and virtual vehicles executing synchronized trajectories coordinated with states of virtual traffic signals in the virtual simulator environment; and contain a virtual road vehicle assigned both a virtual start position and a nominal path through the virtual simulator environment.

10.2 Simulation

The computer system can then run a simulation within the virtual simulator environment in Block S164 and check for collisions between the virtual road vehicle and other (static and dynamic) virtual objects as these virtual objects move along their assigned virtual trajectories in Block S166.

In one implementation, during the simulation, the computer system can: manipulate the set of virtual objects within the virtual simulator environment according to their assigned trajectories; serve perception messages from a perspective of the virtual road vehicle within the virtual simulator environment to an instance of the path planning system configured to execute on a real autonomous vehicle; update a path of the virtual road vehicle within the virtual simulator environment based on navigational commands received from this instance of the path planning system; and then scan the virtual simulator environment for collisions between the virtual road vehicle and these other virtual objects in the virtual simulator environment. In particular, the computer system can run the virtual simulator environment as a "stand-in" for real-world operation of an autonomous vehicle to test and validate the lane network and nominal paths for a road segment before updating a navigation map with the lane network and nominal paths and/or before authorizing autonomous vehicles to operate autonomously within the road segment.

In the foregoing implementation, when the computer system executes the simulation, the virtual simulator environment can generate "messages" similar to messages output by perception and localization systems deployed to real autonomous vehicles. For example, these messages can include data representing both: current locations, orientations, and trajectories of the virtual road vehicle within the virtual simulator environment; and locations, orientations, and trajectories of other virtual objects within the virtual simulator environment. The virtual simulator environment can send these messages to an instance of the motion planning system (i.e., an instance of the same motion planning system deployed to real autonomous vehicles but currently executing on a computer network or static machine rather than executing on an autonomous vehicle). The motion planning system ingests these messages and returns navigational commands, such as steering, brake, and accelerator positions and/or a target path (which may be more granular and higher-resolution than the generic route assigned to the virtual road vehicle in the virtual simulator environment) to maintain the virtual road vehicle on or near its assigned nominal path. The virtual simulator environment can then update the trajectory of the virtual road vehicle within the virtual simulator environment based on these navigational commands received from the motion planning system. For example, the computer system can: implement a vehicle model that characterizes vehicle dynamics of a real autonomous vehicle to calculate a new position and attitude of the virtual road vehicle based on a last state of the virtual road vehicle in the virtual simulator environment and the last navigational command output by the path planning system; and then update the virtual simulator environment to reflect this new position and attitude of the virtual road vehicle.

Throughout the simulation, the virtual simulator environment can repeatedly scan the virtual simulator environment for: collisions between the virtual road vehicle and other dynamic and static virtual objects; instances in which the virtual road vehicle moves outside of bounds defined by the lane network (e.g., into a median or shoulder, over a curb, onto a sidewalk); instances in which the virtual road vehicle comes within a threshold distance of another virtual object (e.g., within a threshold distance of one meter of a pedestrian); and/or instances in which the virtual road vehicle fails to fulfill other predefined autonomous navigation rules.

10.3 Additional Nominal Paths

The computer system can repeat the foregoing methods and techniques to test other nominal paths calculated for this lane network. The computer system can also perturb these nominal paths within their virtual simulator environments and re-run these simulations with the virtual road vehicle traversing these perturbed nominal paths. Therefore, the computer system can execute dozens or hundreds of simulations for the road segment to test a small number of nominal paths generated from an even smaller number of lane marker labels inserted onto the LIDAR frame by the human annotator.

10.4 Error Correction

Responsive to detecting a collision between the virtual road vehicle and a dynamic or static virtual object in the virtual simulator environment, the computer system can interface with the annotation portal to communicate a source of this error to the human annotator and to prompt the human annotator to correct this error in Blocks S168, S140, and S142, such as by modifying a lane marker label or adjusting a nominal path directly. In particular, a collision between the virtual road vehicle and another virtual object in the virtual simulator environment may be due to an incorrect lane segment definition, an incorrect connection between two lane segments, or an improper nominal path spanning a lane segment or extending between two lane segments. Therefore, after detecting a collision in the virtual simulator environment, the computer system can interface with the human annotator—via the annotation portal—to correct a lane marker label defining a lane segment or to correct a nominal path directly.

In one implementation, the computer system (or the annotation portal) highlights a nominal path, a lane segment (or sub-segment), and/or lane marker labels—in the vicinity of a collision detected in a simulation recently completed by the computer system—over the LIDAR frame rendered within the annotation portal. For example, the annotation portal can render the nominal path, the lane segment, or the lane markers labels in an error color (e.g., "red," "orange"). Alternatively, the annotation portal can insert an error flag over the LIDAR frame near the location of this collision in Block S168. Yet alternatively, the computer system can generate a heatmap of collisions detected throughout the lane network based on results of these simulations, and the annotation portal can render this heatmap over the LIDAR frame in order to indicate erroneous nominal path, lane segments, and/or lane marker labels to the human annotator.

The human annotator may then adjust these nominal paths, lane segments, and/or lane marker labels within the annotation portal, such as described above. For example, the human annotator may drag vertices defining these nominal paths, lane segments, and/or lane marker labels over the LIDAR frame; alternatively, the human annotator may delete a lane marker label and insert a replacement lane marker label over the LIDAR frame.

The computer system and the annotation portal can thus return nominal path and lane segment errors to the originating human annotator for correction. Additionally or alternatively, the computer system can interface with another instance of the annotation portal to serve the LIDAR frame, lane network, nominal paths, and a prompt to correct related errors to a different human annotator for correction. For example, after detecting a collision in a simulation in Block S166 and flagging a lane segment or nominal path based on lane marker labels inserted over the LIDAR frame by a first human annotator at a first instance of the annotation portal in Block S168, the computer system can interface with a second instance of the annotation portal to: present this erroneous lane marker label, the nominal path, and the digital frame to a second human annotator; serve a prompt to the second human annotator to manually verify or correct this lane marker label and nominal path; and then receive manual adjustment of this lane marker label and/or nominal path by the second human annotator via this second instance of the annotation portal.

In the foregoing implementations, the computer system can execute a sequence of simulations to test multiple nominal paths spanning multiple lane segments in the road segment after the human annotator has located multiple lane marker labels over the LIDAR frame and confirmed that annotation of the road segment is complete. The computer system can then interface with the annotation portal to highlight nominal paths and/or lane segments that yielded errors in these simulations and to prompt the human annotator to correct these nominal paths and/or lane segments en masse.

Alternatively, the computer system can execute a simulation of a nominal path within the road segment in real-time responsive to the human annotator locating a minimum number of lane marker labels sufficient to define a lane segment over the LIDAR image. Responsive to detecting a collision in this simulation, the computer system can interface with the annotation portal to highlight this nominal path and/or the lane marker labels defining this lane segment and to prompt the human annotator to correct these nominal paths and/or these lane marker labels in (near) real-time.

10.5 Vehicle Motion Characteristics

During a simulation, the computer system can also verify that motion of the virtual road vehicle—traversing or approximately traversing the nominal path—meets predefined motion criteria for passenger vehicles. For example, the computer system can implement a vehicle model (e.g., a "physics model") to calculate new positions and attitudes of the virtual road vehicle responsive to navigational commands generated by the path planning system, as described above. In this example, the vehicle model (or the computer system) can also predict lateral acceleration, longitudinal acceleration, and/or angular velocity about a yaw axis of the virtual road vehicle upon execution of these navigational commands or when assuming the next position and attitude output by the vehicle model. The vehicle model (or the computer system) can regularly execute these calculations during a simulation, and the computer system can store these lateral acceleration, longitudinal acceleration, and/or angular velocity values for this simulation and corresponding locations of the virtual road vehicle within the virtual simulator environment where these values occurred.

The computer system can: compare these motion values to predefined motion criteria for passenger vehicles, such as peak permitted lateral acceleration, longitudinal acceleration, and/or angular velocity values; and flag locations within the virtual simulator environment at which a calculated acceleration or angular velocity of the virtual road vehicle exceeded a corresponding peak permitted motion value—such as due to an erroneous nominal path, erroneous lane segment, and/or erroneous connection between lane segments—in Block S168. The computer system can then interface with the annotation portal to flag these locations over the LIDAR frame, such as by highlighting nominal paths, lane segments, and/or lane marker labels near these flagged locations, and to prompt the human annotator to review and correct these nominal paths, lane segments, and/or lane marker labels. Alternatively, the computer system and/or the annotation portal can generate a heatmap depicting locations within the LIDAR frame at which motion of the virtual road vehicle neared or surpassed these peak permitted motion values, and the annotation portal can then render this heatmap over the LIDAR frame in order to prompt the human annotator to further investigate and correct certain nominal paths, lane segments, and/or lane segment connections that yielded these motion faults in one or more simulations.

The computer system and the annotation portal can thus interface with the human annotator to adjust these nominal paths, lane segments, and/or lane segment connections, such as described above.

Furthermore, the computer system (or the annotation portal) can link a collision to a motion fault detected in this simulation based on physical proximity within the virtual simulator environment and selectively prompt the human annotator to adjust one of a nominal path or a lane marker label based on whether a collision is paired with a motion fault and vice versa. For example, if a simulation yields a collision but no co-spatial motion fault, the annotation portal can prompt the human annotator to adjust lane marker labels near the location of this collision. In another example, if a simulation yields a motion fault but no co-spatial collision and if the motion fault is remote from a lane connection, the annotation portal can prompt the human annotator to adjust the corresponding nominal path directly. However, if a simulation yields a motion fault but no co-spatial collision and if the motion fault is near a lane connection, the annotation portal can prompt the human annotator to adjust a lane connection between lane segments near this motion fault. Furthermore, if a simulation yields a motion fault and a co-spatial collision, the annotation portal can prompt the human annotator to verify each of the nominal path, lane marker labels, and lane connections near this collision.

10.6 Re-Simulation

Once the human annotator adjusts a nominal path, a lane marker label, and/or a lane connection over the LIDAR frame, etc., the computer system can repeat the foregoing methods and techniques to recalculate the lane network, recalculate nominal paths, and re-simulate the road segment according to this revised lane network and revised nominal paths. If the computer system detects additional collisions and/or motion faults, the computer system can again interface with the annotation portal to indicate locations of these collisions and/or motion faults and to prompt the human annotator (or another human annotator) to manually adjust these nominal paths, lane marker labels, and/or lane connections until no collisions or motion faults are produced when simulated.

10.7 Lane Network and Nominal Path Deployment

Therefore, the computer system can: simulate a virtual road vehicle moving through the road segment according to a lane network defined by the human annotator and according to nominal paths calculated by the computer system; check these simulations for collisions and/or motion faults; interface with the human annotator to correct nominal paths, lane connections, and/or lane marker labels responsive to simulated collisions and/or simulated motion faults; and to re-simulate a virtual road vehicle moving through this road segment following corrections from the human annotator. However, once the computer system verifies no collisions and/or no motion faults resulting from the lane network and corresponding nominal paths for this road segment (and following confirmation from the human annotator), the computer system can: update the navigation map based on this final lane network and these final nominal paths in Block S150; and authorize an autonomous vehicle (or a fleet of autonomous vehicles) to operate autonomously within this road segment based on the lane network and nominal paths represented in this navigation map.

In one implementation, in response to detecting absence of collision between virtual objects and the virtual road vehicle within the virtual simulator environment, in response to motion characteristics of the virtual road vehicle simulated within the virtual simulator environment, and/or confirmation of the lane network and nominal paths from the human annotator, the computer system writes definition of lane segments, connections between lane segments, and nominal paths for the road segment—such as in the form of the lane network—to a region of a navigation map representing this road segment. The computer system can then push this updated navigation map (or navigation map updates specific to this road segment) to all deployed autonomous vehicles, deployed autonomous vehicles near the road segment, and/or autonomous vehicles scheduled to autonomously execute routes through this road segment in the near future. Accordingly, the computer system (or a fleet manager) can authorize a fleet of autonomous vehicles to autonomously traverse routes through the road segment according to the lane network and/or nominal paths defined in this updated navigation map. However, the computer system (or the fleet manager) can implement any other method or technique to serve navigation map updates to deployed autonomous vehicles and to authorize these autonomous vehicles to operate within this road segment.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for navigation within a geographic region comprising:
   obtaining a digital frame of a road segment;
   identifying a lane marker represented in the digital frame;
   generating a nominal path over the road segment based on the lane marker;
   characterizing motion of a representative vehicle traversing the nominal path according to a physics model of a road vehicle; and
   updating a navigation map for the road segment based on the nominal path in response to the motion of the representative vehicle traversing the nominal path falling within motion limitations assigned to autonomous vehicles, navigation of at least one particular autonomous vehicle based on the navigation map.

2. The method of claim 1, wherein at least one of the nominal path or a label corresponding to the lane marker is adjusted in response to the motion of the representative vehicle traversing the nominal path deviating from the motion limitations assigned to the autonomous vehicles.

3. The method of claim 1, wherein the motion of the representative vehicle traversing the nominal path is characterized by characterizing lateral accelerations of the representative vehicle traversing the nominal path according to the physics model.

4. The method of claim 1, wherein the nominal path is adjusted in response to lateral accelerations of the representative vehicle traversing the nominal path exceeding a threshold lateral acceleration.

5. The method of claim 4, wherein the threshold lateral acceleration is assigned to the autonomous vehicles.

6. The method of claim 1, wherein the at least one particular autonomous vehicle includes a fleet of autonomous vehicles, each autonomous vehicle in the fleet of autonomous vehicles navigating along a route including the road segment.

7. The method of claim 1, wherein the nominal path is generated based on a center defined between the lane marker and a second lane marker.

8. The method of claim 7, wherein the lane marker and the second lane marker are at least one of adjacent or offset.

9. The method of claim 1, wherein the digital frame is created based on sensor data.

10. The method of claim 1, wherein the sensor data includes a three-dimensional point cloud.

11. One or more tangible non-transitory computer-readable storage media storing computer-executable instructions for performing a computer process on a computing system, the computer process comprising:
    obtaining a digital frame of a road segment;
    identifying a lane marker represented in the digital frame;
    generating a nominal path over the road segment based on the lane marker;
    characterizing motion of a representative vehicle traversing the nominal path according to a physics model of a road vehicle; and
    updating a navigation map for the road segment based on the nominal path in response to the motion of the representative vehicle traversing the nominal path falling within motion limitations assigned to autonomous vehicles, navigation of at least one particular autonomous vehicle based on the navigation map.

12. The one or more tangible non-transitory computer-readable storage media of claim 11, wherein at least one of the nominal path or a label corresponding to the lane marker is adjusted in response to the motion of the representative vehicle traversing the nominal path deviating from the motion limitations assigned to the autonomous vehicles.

13. The one or more tangible non-transitory computer-readable storage media of claim 11, wherein the motion of the representative vehicle traversing the nominal path is characterized by characterizing lateral accelerations of the representative vehicle traversing the nominal path according to the physics model.

14. The one or more tangible non-transitory computer-readable storage media of claim 11, wherein the nominal path is adjusted in response to lateral accelerations of the representative vehicle traversing the nominal path exceeding a threshold lateral acceleration.

15. The one or more tangible non-transitory computer-readable storage media of claim 14, wherein the threshold lateral acceleration is assigned to the autonomous vehicles.

16. The one or more tangible non-transitory computer-readable storage media of claim 11, wherein the at least one particular autonomous vehicle includes a fleet of autonomous vehicles, each autonomous vehicle in the fleet of autonomous vehicles navigating along a route including the road segment.

17. The one or more tangible non-transitory computer-readable storage media of claim 11, wherein the nominal path is generated based on a center defined between the lane marker and a second lane marker.

18. The one or more tangible non-transitory computer-readable storage media of claim 17, wherein the lane marker and the second lane marker are at least one of adjacent or offset.

19. The one or more tangible non-transitory computer-readable storage media of claim 11, wherein the digital frame is created based on sensor data.

20. The one or more tangible non-transitory computer-readable storage media of claim 11, wherein the sensor data includes a three-dimensional point cloud.

* * * * *